United States Patent [19]

Speranza et al.

[11] Patent Number: 4,485,196
[45] Date of Patent: Nov. 27, 1984

[54] LIQUID PHASE POLYOLS WHICH ARE ALKYLENE OXIDE ADDUCTS OF TEREPHTHALIC ESTERS FROM RECYCLED POLYETHYLENE TEREPHTHALATE

[75] Inventors: George P. Speranza, Austin; Robert A. Grigsby, Jr., Georgetown; Michael E. Brennan, Austin, all of Tex.

[73] Assignee: Texaco Inc., White Plains, N.Y.

[21] Appl. No.: 536,136

[22] Filed: Sep. 26, 1983

[51] Int. Cl.³ ............................................ C08G 18/14
[52] U.S. Cl. .................................... 521/172; 252/182; 521/48; 521/173; 528/297; 528/308.1; 560/93
[58] Field of Search ................. 521/131, 48, 172, 173; 528/297, 308.1; 560/93; 252/182

[56] References Cited

U.S. PATENT DOCUMENTS

| | | | |
|---|---|---|---|
| 4,048,104 | 9/1977 | Svoboda et al. | 521/48 |
| 4,223,068 | 9/1980 | Carlstrom et al. | 428/310 |
| 4,246,365 | 1/1981 | Wiedermann et al. | 521/172 |
| 4,439,549 | 3/1984 | Brennan | 521/131 |

*Primary Examiner*—Maurice J. Welsh
*Attorney, Agent, or Firm*—Jack H. Park; Kenneth R. Priem; David L. Mossman

[57] ABSTRACT

A mixture of aromatic polyester polyols useful in preparing rigid foams is described. The polyols are made by first reacting recycled polyethylene terephthalate (PET) scrap with an alkylene glycol to form a reaction product which is then reacted with an alkylene oxide, such as propylene oxide. The resultant mixture of aromatic polyester polyols is a homogeneous liquid which does not precipitate solids upon standing, as do some prior art PET-derived polyols.

19 Claims, No Drawings

LIQUID PHASE POLYOLS WHICH ARE ALKYLENE OXIDE ADDUCTS OF TEREPHTHALIC ESTERS FROM RECYCLED POLYETHYLENE TEREPHTHALATE

CROSS-REFERENCE TO RELATED APPLICATION

This application is related to patent application Ser. No. 443,727 filed on Nov. 22, 1982, now U.S. Pat. No. 4,439,549 which is concerned with aromatic polyester polyol mixtures made from the reaction of PET residues and alkylene oxides with no previous alkylene glycol reaction.

BACKGROUND OF THE INVENTION

1. Field of the Invention

The invention relates to polyols useful in the preparation of rigid polyurethane and polyisocyanurate foams, and more particularly relates to aromatic polyester polyols made from reactions of recycled polyethylene terephthalate with glycols and alkylene oxides.

2. Description of Other Relevant Compounds in the Field

It is known to prepare polyurethane foam by the reaction of polyisocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

In U.S. Pat. No. 4,237,238, a polyol mixture is prepared by the transesterification of a residue from the manufacture of dimethyl terephthalate (DMT) with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759. U.S. Pat. No. 4,233,408 teaches that polyurethane foams may be made from polyester precursors derived from adipic acid process waste. The reaction product of propylene oxide and a partially hydrolyzed DMT process residue is taught as being a useful polyol reactant in the preparation of urethane foams, according to U.S. Pat. No. 4,394,286.

Thus, by-products produced in the manufacture of adipic acid, PET or DMT have long been used as polyols in rigid urethanes. However, bis-hydroxyethyl terephthalate and the corresponding product made from diethylene glycol are solids and separate from solution over time. The resulting non-homogeneous solutions would be difficult to handle on a commercial scale. Such products are also terminated by primary hydroxyl groups, which make for a fast reaction with isocyanates. They also have poor compatibility with fluorocarbon-11, the blowing agent in rigid foams, and other polyols.

It would be desirable to provide an economical extender polyol which did not have the aforementioned disadvantages.

SUMMARY OF THE INVENTION

The invention concerns a mixture of aromatic polyols having hydroxyl and ester functionalities which are useful as extender polyols in preparing rigid foams. The mixtures are made by reacting recycled polyethylene terephthalate with an alkylene glycol to form a terephthalic ester reaction product. This reaction product is subsequently reacted with an alkylene oxide in the presence of a catalyst to make the aromatic polyol mixture.

DETAILED DESCRIPTION OF THE PREFERRED EMBODIMENTS

In general, it has been discovered that rigid foams, such as rigid polyurethane and rigid polyisocyanurate foams, may be made using the mixture of aromatic polyester polyols of this invention either alone or as polyol extenders together with other polyols. The term "polyol extender" is used to mean any inexpensive polyol material that can be used to replace a portion of a more expensive polyol in a foam formulation. Thus, the supply of expensive polyol is extended and the overall cost of the foam is lowered.

Not only are the polyol mixtures of this invention useful polyol extenders in rigid foams, but they also maintain their liquid phase state and do not precipitate solids upon standing. They thus retain their processing ease. In addition, such a polyol mixture is compatible with trichlorofluoromethane (fluorocarbon-11) blowing agent.

While one of the reactants could probably be adipic acid, DMT or PET manufacturing processing residue or waste; that is, any waste or residue stream which contains compounds having the moiety

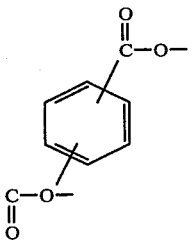

it is much preferred that the reactant of this type be scrap residue from old, recycled polyethylene terephthalate. By recycled PET is meant waste or scrap PET that has already been used in another form and discarded.

Generally, the scrap or recycled PET may be in any particulate form. A frequently seen form is fragmentized soft drink bottles which appear as clear or colored chips. Polyethylene film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent are also useful.

The recycled PET is first reacted with a boiling alkylene glycol. This process forms low molecular weight dihydroxy esters of terephthalic acid. Ordinarily, these diesters are quite crystalline and separate from solution as solids.

Preferably, the alkylene glycol has the formula

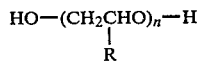

where R is hydrogen or lower alkyl of one to four carbon atoms and n is from 1 to 3. The glycol may be a residue or a flash-separated glycol. Glycols which meet this definition are ethylene glycol (EG), propylene glycol (1,2-propylene glycol), diethylene glycol (DEG), dipropylene glycol and triethylene glycol (TEG), among others. Especially preferred are EG, DEG, propylene glycol and dipropylene glycol. Mixtures of glycols would also be acceptable. The reaction temperature is the boiling point of the glycol.

It has been discovered that when the insoluble diesters are tipped with alkylene oxides the materials are homogeneous liquids and easy to handle. Propylene oxide appears to be particularly effective in this regard and thus is especially preferred. However, any alkylene oxide could be expected to work to some extent. These compounds have the structure

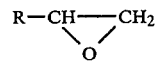

where R is hydrogen or an alkyl group, preferably of 1 to 4 carbon atoms. The simpler alkylene oxides, such as ethylene oxide, propylene oxide (1,2-propylene oxide) and 1,2-butylene oxide are preferred, with propylene oxide being especially preferred. Mixtures of oxides would also be useful.

The proportion of alkylene oxide to be added should be enough to give the desired solubility of the diesters. The amount of alkylene oxide should also be enough to give a desired hydroxyl number. Typically the saponification number of the reaction product of the scrap PET and alkylene glycol is taken into account as a measure of equivalents in figuring the alkylene oxide proportion. The equivalents of alkylene oxide are matched with the equivalents of esterification sites in the PET residue. The weight proportion of alkylene oxide to reaction product commonly ranges from about 35 to 90 weight percent or more.

Generally, the alkoxylation is always catalyzed. Typical catalysts are basic catalysts such as alkali or alkaline earth metal hydroxides or tertiary amines. Even acidic catalysts are used. Especially preferred as catalysts are sodium hydroxide, potassium hydroxide and tertiary amino alkylphenols, such as 2,4,6-tris-(N,N-dimethylaminomethyl)phenol or DMP-30 made by Rohm and Haas which has the structure

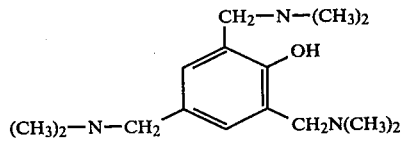

The catalyst may be present in an amount from 0.1 to 10 weight percent based on the residue, preferably from 0.5 to 3.5 weight percent.

The temperature of the preparation process should be from 90° to 160° C. Preferably, the temperature runs from about 100° to 130° C. The pressure should generally range from 1 to 40 atmospheres, preferably from 1 to 20 atmospheres. The mixture of aromatic polyols should have a hydroxyl number in the range from 100 to 500, with an especially preferred range between 200 and 400.

These polyol mixtures can serve as polyol extenders when they are blended with conventional polyols for use in polyurethane foams. The polyols of this invention can also be used alone to prepare isocyanurate foams.

There is good compatibility of the polyols of this invention with trichlorofluoromethane. Trichlorofluoromethane, sold under the tradename FREON® R-11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200–800. Usually the polyether polyol comprises 0–95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2–8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL® R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine and formaldehyde.

The final polyol combination more preferably comprises 0–95 percent by weight of said polyether polyol and 100–5 percent by weight of aromatic polyester polyol. Although the aromatic polyols of this invention may be used alone, it is preferred that they be present in an amount of from 30 to 70 weight percent of the polyol blend. The polyol combination in many instances has a total hydroxyl number ranging from about 100 to about 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyantes therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from PET residues.

Surfactant agents, better known as silicone oils, are added to serve as a cell stabilizer. Some representative materials are sold under the names of L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyol mixtures are used as polyol extenders to prepare foams.

Many modifications may be made in the polyol mixtures of this invention and their method of production without departing from the spirit and scope of the invention which is defined only in the appended claims. For example, one skilled in the art could adjust the temperature, pressure, reactants, proportions and modes of additions to provide polyol mixtures that give foams with optimal properties.

EXAMPLE 1

To a five-gallon stirred autoclave was added 4800 g of diethylene glycol and 3200 g of polyethylene terephthalate chips. The contents were flushed with nitrogen and then heated to 230° C. After about three hours at 230°–250° C. a total of 800 ml of overhead was collected. The overhead contained 5.7% water, 75.9% ethylene glycol and 18.4% diethylene glycol. The remainder was a liquid which had the following properties—hydroxyl number 493; viscosity 500 centistokes at 77° F. This product deposited white solids after standing several days.

EXAMPLE 2

To a one-liter 3-necked flask equipped with a stirrer was added 600 g of the product of Example 1, 8 g of KOH and 8 g of water. The contents were heated to 90° C. and the water was removed under vacuum. Then 429 g of this solution was added to a one liter stirred autoclave. The autoclave was closed, flushed with nitrogen and 219 g of propylene oxide added at 120° C. over a 2.5 hour period. The product was neutralized with 5.5 g of oxalic acid in 10 ml of water. Then 50 g of Britesorb and 50 g of water were added. The product was then heated at 100° C. for two hours and the product was stripped of water. After filtering the product had an hydroxyl number of 351, viscosity at 77° F. of 764 centipoises and a pH of 6.8. After one month no solids separated in the bottom of the bottle. A nuclear magnetic resonance spectrum showed the product to be an ethylene oxide/propylene oxide adduct of terephthalic acid and primary and secondary hydroxyl groups in about equal amounts. The ethylene oxide shows up because of the DEG added earlier.

EXAMPLE 3

To the same 5-gallon autoclave as used in Example 1 was added 3200 g of PET and 4800 g of DEG. After flushing with nitrogen and heating to 220° C. the contents were held at this temperature for two hours without removing any overhead. The product had a hazy appearance and after one day solids began to separate. It had a hydroxyl number of 632.

EXAMPLE 4

To 429 g of the product obtained in Example 3 was added 280 g of propylene oxide using 4.3 g of POLYCAT ® 41 as catalyst. POLYCAT 41 is an Abbot product having the formula [(CH$_3$)$_2$—N—CH$_2$CH$_2$CH$_2$—N—CH$_2$]$_3$. The product produced had a hydroxyl number of 485, viscosity at 77° F. of 233 cps. It was a liquid.

EXAMPLE 5

Example 4 was repeated except that DMP-30 was used as a catalyst. The product had a hydroxyl number of 431 and was liquid.

EXAMPLE 6

In this example 213 g of ethylene oxide was added to 429 g of the product made in Example 3. The product was a liquid and had a hydroxyl number of 455. The catalyst used was POLYCAT 41 and the reaction temperature was 110° C.

EXAMPLE 7

Example 2 was repeated except the potassium hydroxide concentration was reduced to 2.1 g and the product neutralized with glycolic acid. The product had a hydroxyl number of 345, saponification number of 168 and a viscosity of 466 cps at 77° F.

EXAMPLE 8

To a one-liter stirred autoclave was added 355 g of product described in Example 3. Then 4.0 g of potassium hydroxide was added and the contents heated to 110° C. Thirty-five ml of ethylene oxide was added and then 280 ml of propylene oxide was allowed to react over a four hour period.

The propylene oxide additions were performed at about 120° C. The reaction mixture was neutralized by adding five drops of dilute sulfuric acid and a pH of 6.4 was obtained. This product had a hydroxyl number of 383 and a viscosity of 257 cps at 77° F. The product was a liquid and did not deposit any crystals over the time span of this study.

EXAMPLE 9

In this run 1080 g of PET was heated with 720 g of diethylene glycol for three hours at 220° C. The product had a hydroxy number of 418 and a viscosity of 34,266 cps at 77° F. The product began to deposit solids after a short period of time.

EXAMPLE 10

To 400 g of product prepared in Example 9 was added 4.0 g of potassium hydroxide. The contents were heated to 120° C. and 173 g of propylene oxide added at this temperature over a period of three hours. The product was neutralized with oxalic acid. The product had a hydroxyl number of 237 and was liquid.

Preparation of Fire Retarded Rigid Polyurethane and Polyisocyanate Foams

The experimental aromatic polyester polyols were used as extender polyols at the 30% level in THANOL® R-350-X and THANOL R-650-X polyurethane formulations or as the sole polyol in polyisocyanurate formulations.

Formulation components were mixed at 2700 rpm and poured into an 8"×8"×12" (600 g pour) open mold and allowed to rise. The resulting foams were allowed to stand at room temperature for at least three days before testing. Formulations, reaction profiles and visual observations are listed below. Physical property data are noted in a separate table.

TABLE I

| Polyurethane Foams Formulation, pbw | A | B | C | D | E | F |
|---|---|---|---|---|---|---|
| THANOL R-350-X (OH = 534) | 23.1 | — | 24.3 | — | 24.4 | — |
| THANOL R-650-X (OH = 442) | — | 24.9 | — | 26.3 | — | 26.4 |
| Polyol, Ex. 1 (OH = 493) | 9.9 | 10.7 | — | — | — | — |
| Polyol, Ex. 2 (OH = 351) | — | — | 10.4 | 11.3 | — | — |
| Polyol, Ex. 7 (OH = 345) | — | — | — | — | 10.4 | 11.3 |
| ANTIBLAZE® 80[1] | 5.0 | 5.0 | 5.0 | 5.0 | 5.0 | 5.0 |
| Water | 0.2 | 0.2 | 0.2 | 0.2 | 0.2 | 0.2 |
| FREON® R-11[2] | 12.0 | 12.0 | 12.0 | 12.0 | 12.0 | 12.0 |
| L-5420[3] | 0.5 | 0.5 | 0.5 | 0.5 | 0.5 | 0.5 |
| FOMREZ® UL-32[4] | 0.01 | 0.01 | 0.01 | 0.01 | 0.01 | 0.01 |
| MONDUR® MR[5] (index = 1.2) | 49.3 | 46.7 | 47.6 | 44.7 | 47.5 | 44.6 |
| Times (secs.), mixing | 8 | 6 | 8 | 6 | 10 | 8 |
| cream | 15 | 13 | 16 | 14 | 16 | 15 |
| gel | 54 | 44 | 63 | 59 | 65 | 61 |
| tack free | 78 | 57 | 82 | 76 | 90 | 83 |
| rise | 121 | 115 | 128 | 121 | 138 | 128 |
| Initial Surface Friability | None | None | None | None | None | None |
| Foam Appearance | Good | Good | Good | Good | Good | Good |

[1]Tris-(2-chloropropyl)phosphate, a fire retardant sold by Mobil Chemical.
[2]Trichlorofluoromethane
[3]A silicone surfactant sold by Union Carbide Corp.
[4]A tin catalyst sold by Witco Chemical Corp.
[5]A polymeric isocyanate sold by Upjohn Co.

TABLE II

| Polyisocyanurate Foams Formulation, pbw | G | H | I | J | K | L |
|---|---|---|---|---|---|---|
| Polyol, Ex. 1 (OH = 493) | 12.6 | — | — | — | — | — |
| Polyol, Ex. 2 (OH = 351) | — | 16.6 | — | — | — | — |
| Polyol, Ex. 7 (OH = 345) | — | — | 16.8 | — | — | — |
| Polyol, Ex. 10 (OH = 237) | — | — | — | 21.3 | — | — |
| Polyol, Ex. 8 (OH = 383) | — | — | — | — | 14.4 | — |
| Polyol, Ex. 6 (OH = 455) | — | — | — | — | — | 25.45 |
| ANTIBLAZE 80 | — | — | — | 4.5 | 4.9 | 5.2 |
| FREON R-11 | 12.0 | 12.0 | 12.0 | 11.8 | 12.8 | 13.45 |
| Silicone DC-193[1] | 0.5 | 0.5 | 0.5 | 0.45 | 0.5 | 0.5 |
| T-45[2] | 0.7 | 1.5 | 1.5 | 1.35 | 1.5 | — |
| MONDUR MR | 74.2 | 69.4 | 69.2 | 60.6 | 65.9 | 55.4 |

TABLE II-continued

| Polyisocyanurate Foams Formulation, pbw | G | H | I | J | K | L |
|---|---|---|---|---|---|---|
| Index | 5.0 | 5.0 | 5.0 | 5.0 | 5.0 | 2.0 |
| Times (secs.), mixing | 3 | 3 | 3 | 4 | 3 | 4 |
| cream | 11 | 6 | 6 | 8 | 5 | 8 |
| gel | 35 | 22 | 25 | 40 | 17 | 20 |
| tack free | 360+ | 34 | 69 | 100 | 38 | 23 |
| rise | 83 | 59 | 58 | 92 | 34 | 53 |
| Initial Surface Friability | Yes | Yes | Yes | Yes | Yes | None |
| Foam Appearance | Fair | Good | Good | Good | Good | Good |

[1] A silicone surfactant made by Dow-Corning Corp.
[2] Potassium octoate in glycol made by M&T Chemical Co.

TABLE III

| | Physical Properties | | | | | | | | | | | |
|---|---|---|---|---|---|---|---|---|---|---|---|---|
| | Rigid Polyurethane Foams | | | | | | Isocyanurate Foams | | | | | |
| Formulation | A | B | C | D | E | F | G | H | I | J | K | L |
| Density (lbs/ft$^3$) | 1.73 | 1.90 | 1.83 | 1.83 | 1.80 | 1.84 | 1.96 | 2.13 | 2.00 | 2.47 | 2.06 | 1.85 |
| K-factor | 0.122 | 0.120 | 0.119 | 0.129 | 0.128 | 0.121 | 0.138 | 0.137 | 0.145 | 0.138 | 0.132 | 0.122 |
| Comp. str. (psi) | | | | | | | | | | | | |
| with rise | 36.82 | 43.45 | 39.27 | 38.10 | 41.50 | 39.62 | 28.95 | 30.48 | 30.96 | 35.89 | 27.69 | 34.28 |
| against rise | 12.86 | 14.62 | 13.57 | 14.67 | 13.87 | 12.67 | 17.09 | 18.36 | 17.26 | 25.75 | 15.26 | 9.57 |
| Heat distortion (°C.) | 148 | 112 | 144 | 116 | 122 | 129 | >225 | >225 | >225 | >225 | >225 | 137 |
| Closed cells, % | 92.33 | 91.94 | 90.81 | 91.21 | 91.37 | 92.36 | 89.77 | 88.24 | 90.06 | 88.84 | 85.69 | 91.83 |
| Friability (% wt loss, 10 min.) | 2.78 | 3.06 | 3.15 | 3.33 | 3.59 | 3.38 | 72.76 | 80.73 | 67.22 | 69.70 | 88.70 | 2.93 |
| ASTM 1692 burn, in./min. (BHA) | 2.49 | 2.17 | 2.64 | 2.38 | 1.75 | 2.29 | 1.55 | 1.10 | 1.41 | 1.07 | 1.26 | 1.93 |
| Butler Chimney Test | | | | | | | | | | | | |
| Flame height, in. | >11 | >11 | >11 | >11 | >11 | >11 | 5.0 | 6.0 | 6.5 | 4.2 | 4.1 | >11 |
| Sec. to extinguish | 16 | 14 | 13 | 10 | 34 | 17 | 11.0 | 10.8 | 10.0 | 10.0 | 10.7 | 11.8 |
| % wt. retained | 59.1 | 63.4 | 60.1 | 85.9 | 38.8 | 60.1 | 94.5 | 92.5 | 92.7 | 96.2 | 94.7 | 80.5 |

We claim:

1. A mixture of aromatic polyols having hydroxyl and ester functionalities for use in preparing rigid foams, being produced by the process comprising
   a. reacting recycled polyethylene terephthalate with an alkylene glycol to form a reaction product and
   b. subsequently reacting the reaction product of step a. with an alkylene oxide in the presence of a catalyst.

2. The mixture of claim 1 in which the alkylene glycol has the formula

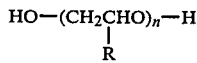

where R is hydrogen or lower alkyl of 1 to 4 carbon atoms and n is from 1 to 3.

3. The mixture of claim 1 in which the alkylene glycol is selected from the group consisting of ethylene glycol, diethylene glycol, propylene glycol, dipropylene glycol and mixtures thereof.

4. The mixture of claim 1 in which the step b. reaction is conducted at a temperature in the range of 90° to 160° C.

5. The mixture of claim 1 in which the alkylene oxide is selected from the group consisting of ethylene oxide, propylene oxide, 1,2-butylene oxide and mixtures thereof.

6. The mixture of claim 1 in which the alkylene oxide is propylene oxide.

7. The mixture of claim 1 in which the catalyst in step b. is selected from the group consisting of acid catalysts and basic catalysts in turn selected from the group consisting of sodium hydroxide, potassium hydroxide and amine catalysts.

8. A mixture of claim 1 in which the average hydroxyl number of the resultant mixture is between 100 and 500.

9. A rigid polyurethane foam obtained by reacting in the presence of a blowing agent and a catalyst of polyurethane formation an organic polyisocyanate and a polyol comprising the mixture of aromatic polyols of claim 1.

10. A rigid polyisocyanurate foam obtained by reacting in the presence of a blowing agent and a trimerization catalyst of polyisocyanurate formation, an organic polyisocyanate and the mixture of aromatic polyols of claim 1.

11. A mixture of aromatic polyols having hydroxyl and ester functionalities for use in preparing rigid foams, being produced by the process comprising
   a. reacting recycled polyethylene terephthalate with an alkylene glycol selected from the group consisting of ethylene glycol, diethylene glycol, propylene glycol and dipropylene glycol and mixtures thereof, to form a reaction product and
   b. subsequently reacting the reaction product of step a. with propylene oxide in the presence of a catalyst.

12. A process for the production of aromatic polyols having hydroxyl and ester functionalities for use in preparing rigid foams, comprising
   a. reacting recycled polyethylene terephthalate with an alkylene glycol to form a reaction product and
   b. subsequently reacting the reaction product of step a. with an alkylene oxide in the presence of a catalyst.

13. The process of claim 12 in which the alkylene glycol has the formula

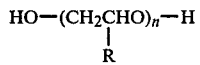

where R is hydrogen or lower alkyl of 1 to 4 carbon atoms and n is from 1 to 3.

14. The process of claim 12 in which the alkylene glycol is selected from the group consisting of ethylene glycol, diethylene glycol, propylene glycol, dipropylene glycol and mixtures thereof.

15. The process of claim 12 in which the step b. reaction is conducted at a temperature in the range of 90° to 160° C.

16. The process of claim 12 in which the alkylene oxide is selected from the group consisting of ethylene oxide, propylene oxide and 1,2-butylene oxide.

17. The process of claim 12 in which the alkylene oxide is propylene oxide.

18. The process of claim 12 in which the catalyst in step b. is selected from the group consisting of acid catalysts and basic catalysts in turn selected from the group consisting of sodium hydroxide, potassium hydroxide and amine catalysts.

19. The process of claim 12 in which the average hydroxyl number of the resultant mixture is between 100 and 500.

* * * * *